United States Patent
Varghese et al.

(10) Patent No.: US 10,097,299 B2
(45) Date of Patent: Oct. 9, 2018

(54) METHOD FOR TIME SYNCHRONIZATION OF DEVICES IN A CONTROL NETWORK

(71) Applicant: ABB Schweiz AG, Baden (CH)

(72) Inventors: Anitha Varghese, Bangalore (IN); Mallikarjun Kande, Bangalore (IN); Pradnya Gaonkar, Bangalore (IN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/539,606

(22) PCT Filed: Dec. 24, 2015

(86) PCT No.: PCT/IB2015/059973
§ 371 (c)(1),
(2) Date: Jun. 23, 2017

(87) PCT Pub. No.: WO2016/103227
PCT Pub. Date: Jun. 30, 2016

(65) Prior Publication Data
US 2018/0013507 A1    Jan. 11, 2018

(30) Foreign Application Priority Data
Dec. 24, 2014  (IN) .......................... 6546/CHE/2014

(51) Int. Cl.
*H04J 3/06* (2006.01)
*G05B 19/418* (2006.01)
(52) U.S. Cl.
CPC ...... *H04J 3/0667* (2013.01); *G05B 19/41865* (2013.01); *H04J 3/0641* (2013.01);
(Continued)
(58) Field of Classification Search
CPC .... G05B 19/41856; G05B 2219/31213; G05B 2219/31229; H04L 43/0858; H04L 41/12; H04J 3/0641; H04J 33/0682
See application file for complete search history.

(56) References Cited

U.S. PATENT DOCUMENTS

2012/0089262 A1  4/2012  Wang et al.
2012/0147941 A1  6/2012  Su et al.
(Continued)

FOREIGN PATENT DOCUMENTS

EP    1990938 A1    11/2008
WO    2013090246 A1    6/2013

OTHER PUBLICATIONS

International Search Report, International Application No. PCT/IB2015/059973, dated Mar. 23, 2016, 5 pages.
(Continued)

*Primary Examiner* — Mewale Ambaye
(74) *Attorney, Agent, or Firm* — Barnes & Thornburg LLP

(57) ABSTRACT

The present invention provides a method for time synchronizing one or more devices in a control network using a first device. The method comprises selecting a first device from information of the topology of the control network. The method further comprises sending a first set of packets to the second device, receiving a first set of delay requests in response to the first set of packets, and sending a first set of delay responses in response to the first set of delay requests. The method further comprises, determining a first set of forward times and first set of backward times. The method further comprises, determining a first minimum forward time and a first minimum backward time. Further the method comprises determining a first correction factor. The method also comprises, applying the first correction factor to a clock provided at the second device and storing the first correction factor.

6 Claims, 5 Drawing Sheets

(52) U.S. Cl.
CPC .. *H04J 3/0682* (2013.01); *G05B 2219/31213* (2013.01); *G05B 2219/31229* (2013.01)

(56) References Cited

U.S. PATENT DOCUMENTS

| | | | | |
|---|---|---|---|---|
| 2014/0080486 A1* | 3/2014 | Nitta | ............... | H04W 36/04 455/436 |
| 2014/0362960 A1* | 12/2014 | Matsunaga | ......... | H04W 56/004 375/358 |

OTHER PUBLICATIONS

Written Opinion, International Application No. PCT/IB2015/059973, dated Mar. 23, 2016, 7 pages.

International Preliminary Report on Patentability, International Application No. PCT/IB2015/059973, dated Jun. 27, 2017, 8 pages.

Kezunovic et al., "Signal Processing, Communication, and Networking Requirements for Synchrophasor Systems," Signal Processing Advances in Wireless Communications (SPAWC), 2012 IEEE 13th International Workshop, IEEE, Jun. 17, 2012, pp. 464-468.

Tournier et al., "Strategies to Secure the IEEE 1588 Protocol in Digital Substation Automation," Critical Infrastructures, 2009, CRIS 2009, Fourth International Conference, IEEE, Mar. 27, 2009, pp. 1-8.

Zhu et al., "IEC 61850-Based Information Model and Configuration Description of Communication Network in Substation Automation," IEEE Transactions on Power Delivery, IEEE Service Center, vol. 29, No. 1, Feb. 1, 2014, pp. 97-107.

* cited by examiner

METHOD FOR TIME SYNCHRONIZATION OF DEVICES IN A CONTROL NETWORK

CROSS-REFERENCE TO RELATED APPLICATIONS

This application is a U.S. national stage of International Application Serial No. PCT/IB2015/059973, filed Dec. 24, 2015, which claims priority to Indian Patent Application No. 6546/CHE/2014, filed Dec. 24, 2014. The entire disclosures of both of the foregoing applications are hereby incorporated by reference.

FIELD OF INVENTION

The present invention relates generally to control devices and more specifically to time synchronization of the control devices in an automation environment.

BACKGROUND OF THE INVENTION

Control devices such as controllers, Intelligent Electronic Devices, etc., are used in industries to monitor and control various equipment. Additionally, the control devices also perform the function of logging faults which occur in an automation environment. Along with the faults, the control devices also log the respective time instances of the corresponding faults. The order of faults logged by the control devices can be identified from the respective time instances logged by the control devices. In order to design better protection systems for the automation environment, it is essential that the correct sequence of the faults is identified. Therefore it is critical for the plurality of control devices to be time synchronized.

In order to achieve time synchronization, high end control devices have advanced time synchronization capabilities through various protocols. The use of such various protocols requires time stamping at network interface hardware corresponding to each of a plurality of communicating elements, a master clock and a plurality of network elements with boundary clocks.

Equipment required for such precision time synchronization, over a communication network, are relatively expensive. Such equipment are not cost effective for low end control devices. Therefore time synchronization of the low end control devices is done manually, by plugging the device to a standalone PC or a handheld device, usually through a serial interface. The method of time synchronization involves manually writing a reference time to the control device's clock. This is time consuming and inefficient method, especially when large number of control devices are distributed over a large area inside the plant. Moreover the method is not accurate and the time synchronization errors may vary from several milliseconds to a few seconds.

Therefore there is a need for an improvised method for time synchronization of control devices in the automation environment.

SUMMARY OF THE INVENTION

An aspect of the present invention provides a method for time synchronizing one or more devices in an automation environment using a first device, the one or more devices being connected through a control network, wherein the first device comprises information of a topology of the control network. The method comprises selecting, by the first device, a second device in the control network, based on the information of the topology of the control network. Further the method comprises sending, by the first device, a first set of packets to the second device and receiving, by the first device, a first set of delay requests corresponding to the first set of respective packets. The method further comprises sending, by the first device, a first set of delay responses to the second device corresponding to the first set of respective delay requests.

Further the method comprises, determining, by the second device, a first set of forward times and a first set of backward times, based on the first set of packets and the first set of delay responses, respectively. The method further comprises determining, by the second device, a first minimum forward time from the first set of forward times and a first minimum backward time from the first set of backward times. The method further comprises determining, by the second device, a first correction factor, from the first minimum forward time and the first minimum backward time, corresponding to a first instance of time synchronization. The method also comprises applying, by the second device, the first correction factor to a clock provided at the second device and storing the first correction factor at the first device.

In accordance with the aspect, the selection of the second device from the topology of the control network may be based on a number of devices in direct communication with the second device. Alternately the selection of the second device from the topology of the control network may be based on strength of a connection between the second device and a third device to be time synchronized. Further, in accordance with the aspect the control network may comprise at least one backup device, wherein the at least one backup device is configured for time synchronizing the one or more devices upon a failure of the first device.

In accordance with the aspect, the method may further comprise sending, by the first device, a second set of packets to the second device and receiving, by the first device, a second set of delay requests corresponding to the second set of respective packets. Further the method may comprise sending, by the first device, a second set of delay responses to the second device corresponding to the second set of respective delay requests. The method may further comprise determining, by the second device, a second set of forward times and a second set of backward times, based on the second set of packets and the second set of delay responses, respectively. The method may further comprise determining, by the second device, a second minimum forward time from the second set of forward times and a second minimum backward time from the second set of backward times.

Further the method may comprise determining, by the second device, a second correction factor, from the second minimum forward time and the second minimum backward time, corresponding to a second instance of time synchronization. The method may further comprise applying, by the second device, the second correction factor to the clock provided at the second device and storing the second correction factor at the first device. The method may also comprise, correcting a time instance of an event logged by the second device, between the first instance of time synchronization and the second instance of time synchronization, by interpolating the time instance of the event, based on the first correction factor and the second correction factor. Further in accordance with the aspect, the interpolation of the time instance of the event may comprise utilization of a linear interpolation function.

BRIEF DESCRIPTION OF DRAWINGS

The subject matter of the present invention will be explained in more detail in the following text with reference to exemplary embodiments which are illustrated in attached drawings in which.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present invention provides a method for time synchronization of one more devices in an automation environment. The one or more devices include, but are not limited to, Intelligent Electronic Devices (IEDs), controllers, data aggregators and sensors etc. distributed across the automation environment.

Figure 1:
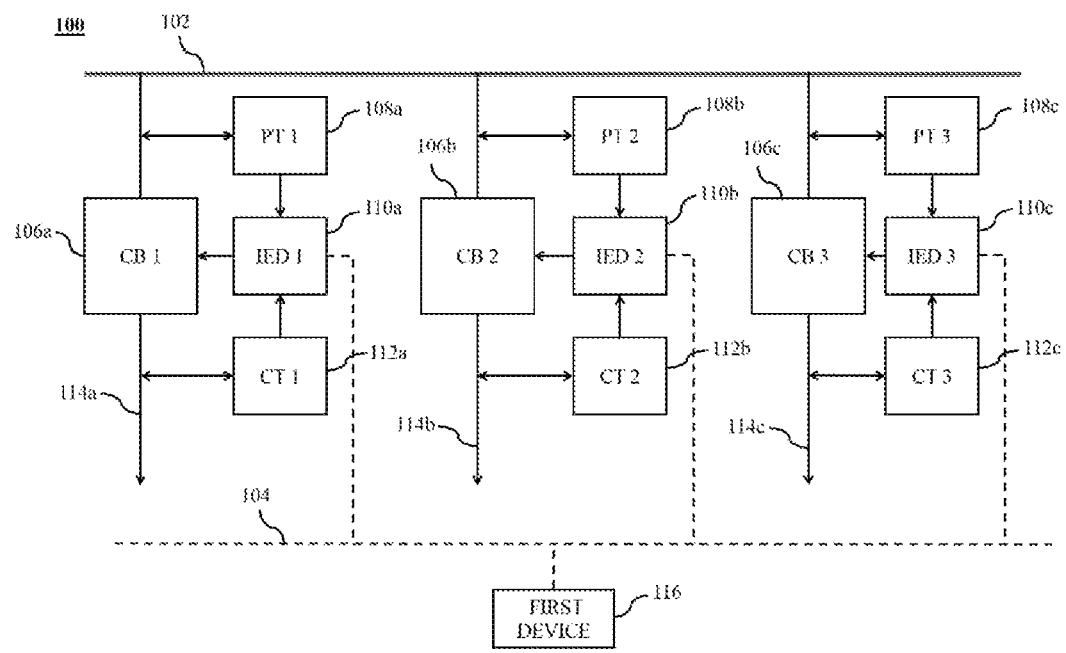
FIG. 1 illustrates an exemplary automation environment, implemented in an electrical substation.

FIG. 1 illustrates an exemplary automation environment, implemented in an electrical substation 100. The electrical substation 100 includes a main bus 102. A plurality of feeder lines 114 (for e.g., 114a, 114b and 114c etc.) are connected to the main bus 102. The electrical substation 100 also includes a plurality of circuit breakers 106 (for e.g., 106a, 106b and 106c etc.), such that at least one circuit breaker is provided in each one of the plurality of feeder lines 114. Each circuit breaker from the plurality of circuit breakers 106, is configured to be triggered by a corresponding IED from a plurality of IEDs 110 (for e.g., 110a, 110b and 110c etc.). The plurality of IEDs 110 in turn are configured to receive a plurality of voltage signals as inputs from a plurality of corresponding power transformers 108 (for e.g., 108a, 108b and 108c). The plurality of IEDs 110 are also configured to receive a plurality of current signals from a plurality of corresponding current transformers 112 (for e.g., 112a, 112b and 112c).

The plurality of IEDs 110 utilize the plurality of voltage signals and the plurality of current signals to detect a fault condition and trip the corresponding circuit breakers, thereby saving the downstream network components from damage due to a fault current. Additionally the plurality of IEDs 110 also log the occurrence of a plurality of faults and respective instances of time at which the corresponding fault happened. The plurality of faults and the respective instances of time are stored as a plurality of disturbance records at the plurality of corresponding IEDs 110. The plurality of disturbance records can be accessed through a control network 104, to which the plurality of IEDs 110 are connected.

The plurality of faults logged by the plurality of IEDs 110, can be ordered based on the respective time instances. In order to design better protection systems for the electrical substation 100, it is essential that the correct order of the plurality of faults logged by the plurality of IEDs 110 is identified. Therefore it is critical for the plurality of IEDs 110 to be time synchronized. One or more IEDs from the plurality of IEDs 110 are time synchronized using a first device 116 connected to the control network 104. The first device 116 stores information of a topology of the control network 104. According to an embodiment the first device 116 is a mobile handheld device.

According to various embodiments, the mobile handheld device time synchronizes the one or more IEDs, on a point to point basis, that is each of the one or more IEDs is time synchronized individually using the mobile handheld device. According to various embodiments, the one or more IEDs are divided into one or more controller IEDs and one or more subordinate IEDs, such that the one or more controller IEDs are configured to be time synchronized using the mobile handheld device as the first device 116. The one or more subordinate IEDs are configured to be time synchronized using a corresponding controller IED as the first device 116.

According to various embodiments, the control network 104 comprises at least one backup IED, such that, in the event of failure of a controller IED, the at least one backup IED is time synchronized using the mobile handheld device. The mobile handheld device uses the information of the topology of the control network 104, to identify the backup IED. The backup IED then time synchronizes the subordinate IEDs corresponding to the failed controller IED.

Figure 2:
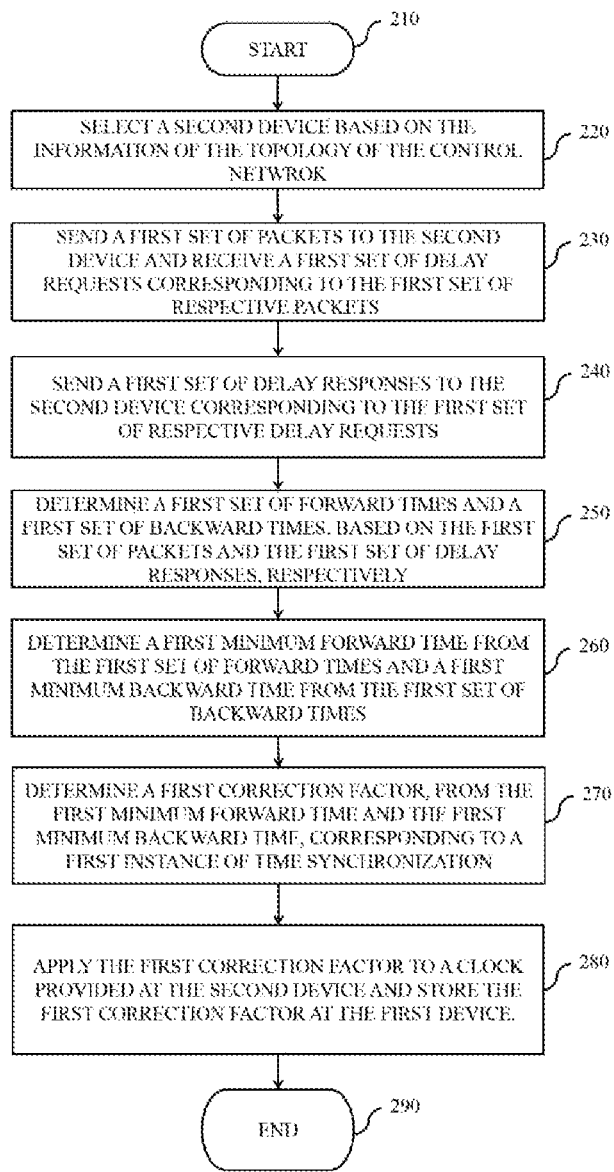
FIG. 2 illustrates a flowchart depicting a plurality of steps involved in time synchronization of one or more devices in the electrical substation using a first device.

FIG. 2 illustrates a flowchart depicting a plurality of steps involved in time synchronization of one or more devices in the electrical substation 100 using the first device 116. The method begins at step 210. At step 220, the first device 116 selects a second device for time synchronization, based on the information of the topology of the control network 104. The selection of the second device is such that, the total time taken for time synchronization of the one or more devices is minimized. According to various embodiments, the second device is selected based on a number of devices in direct communication with the second device in the control network 104. According to various embodiments, the selection of the second device is based on the strength of a connection between the second device and a third device to be time synchronized. In another embodiment, the second device is selected on the basis of minimum propagation delay i.e. the first device selects a device as the second device which has the minimum propagation delay.

In an embodiment, the first device 116 selects the IED 110a for time synchronization. In accordance with the embodiment, at step 230, the first device 116 sends a first set of packets to the IED 110a. Also the first device 116 receives a first set of delay requests, corresponding to the first set of respective packets. At step 240, the first device 116, sends a first set of delay responses, corresponding to the first set of respective delay requests. At step 250, the IED 110a, determines a first set of forward times and a first set of backward times from the first set of packets and the first set of delay responses respectively. The determination of the first set of forward times and the first set of backward times can be understood from the following example.

For e.g., the first device 116 sends a packet to the IED 110a at time $t_1$. The packet includes a timestamp $t_1$ for time synchronization of the IED 110a. The packet is received at the IED 110a at time $t_2$. The IED 110a will use a clock provided at IED 110a to timestamp the time $t_2$. Alternately the first device 116 may also send a follow up packet with a timestamp $t_1$, in order to account for the delay in transmission of the packet, which is registered by the IED 110a. The IED 110a determines the forward time $A_{11}$ from the timestamps $t_1$ and $t_2$ using equation 1.

$$A_{11} = t_2 - t_1 \quad \text{(Eqn 1)}$$

The forward time $A_{11}$ is the sum of offset of the clock provided at the IED 110a and a propagation delay $C_{11}$ of the packet from the first device to the IED 110a. The propagation delay $C_{11}$ (forward or backward) is variable and is subject to network conditions at the time of transmission of the packet, whereas the offset between the clock of the first device and the IED 110 is relatively static. In order to account the propagation delay $C_{11}$ for determining the offset for synchronizing the IED 110a, the IED 110a sends a delay request to the first device 116 at time $t_3$ with the timestamps $t_3$. The delay request is received at the first device 116 at time $t_4$. The first device 116 then sends a delay response to the IED 110a, with the timestamp $t_4$. The IED 110a determines a backward time $B_{11}$ from the timestamps $t_3$ and $t_4$ using equation 2.

$$B_{11} = t_4 - t_3 \quad \text{(Eqn 2)}$$

The equation 1 is applied to each packet from the first set of packets to arrive at the first set of forward times (for e.g., $A_{11}, A_{12}, A_{13} \ldots A_{1n}$, etc.). The equation 2 is applied to each delay response from the first set of delay responses to arrive at the first set of backward times (for e.g., $B_{11}$, $B_{12}$, $B_{13} \ldots B_{1n}$ etc.). At step 260, the IED 110a determines a first minimum forward time $A_{1min}$ and a first minimum backward time backward time $B_{1min}$ from the first set of forward times and the first set of backward times, respectively. At step 270 a first correction factor $\Delta_1$ is determined, by the IED 110a, from the first minimum forward time $A_{1min}$ and the first minimum backward time $B_{1min}$ using equation 3.

$$\Delta_1 = \frac{A_{1min} - B_{1min}}{2} \quad \text{(Eqn 3)}$$

At step 280, the IED 110a applies first correction factor $\Delta_1$ to the clock provided at the IED 110a and stores the first correction factor $\Delta_1$ at the first device 116. In an embodiment, the correction factor is subtracted from the clock of the IED 110a. At step 290, the method concludes. The method described above is not limited an electrical substation environment. The same method can be applied to a plurality of automation environments.

Figure 3:
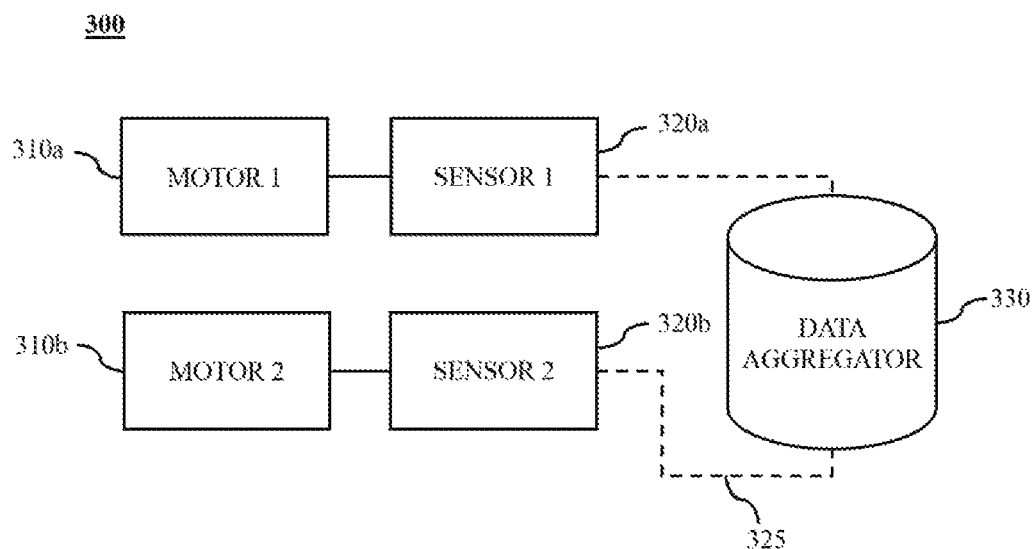
FIG. 3 illustrates a second exemplary automation environment, implemented in an industrial plant.

FIG. 3 illustrates a second exemplary automation environment, implemented in an industrial plant 300. According to various embodiments, the industrial plant 300 is a manufacturing plant or a food processing plant or a thermal power plant. The industrial plant 300 includes a plurality of motors 310 (for e.g., 310a and 310b etc.). The industrial plant 300 also includes a plurality of sensors 320 (for e.g., 320a and 320b), such that each motor from the plurality of motors 310 is connected to a respective sensor from the plurality of sensors 320. A data aggregator 330 is connected to the plurality of sensors 320 through a network 325. The data aggregator 330 is configured to collect data corresponding to plurality of motors 310, from the plurality of sensors 320.

In the event of a failure of a motor (for e.g., 310a), the corresponding sensor 320a reports the failure to the data aggregator 330. This allows the failed motor 310a to be isolated from the other motors (for e.g., 310b) and prevent the other motors from failure due to a cascading effect. Moreover the sensor 320a also logs the failure with a corresponding time instance of the failure, at the data aggregator 330. The identification of correct order of a plurality of failures logged by the plurality of sensors 320 allows better protection systems to be designed for the industrial plant 300. Hence it is essential for the plurality of sensors 320 to be time synchronized with the data aggregator 330.

In an embodiment, the data aggregator 330 time synchronizes the sensor 320a from the plurality of sensors 320. In accordance with the embodiment, the data aggregator 330 sends a first set of packets to the sensor 320a. Also the data aggregator 330 receives a first set of delay requests, corresponding to the first set of respective packets. The data aggregator 330, then sends a first set of delay responses, corresponding to the first set of respective delay requests. The sensor 320a, determines a first set of forward times and a first set of backward times from the first set of packets and the first set of delay responses respectively. The determination of the first set of forward times and the first set of backward times can be understood from the following timing diagram.

Figure 4:
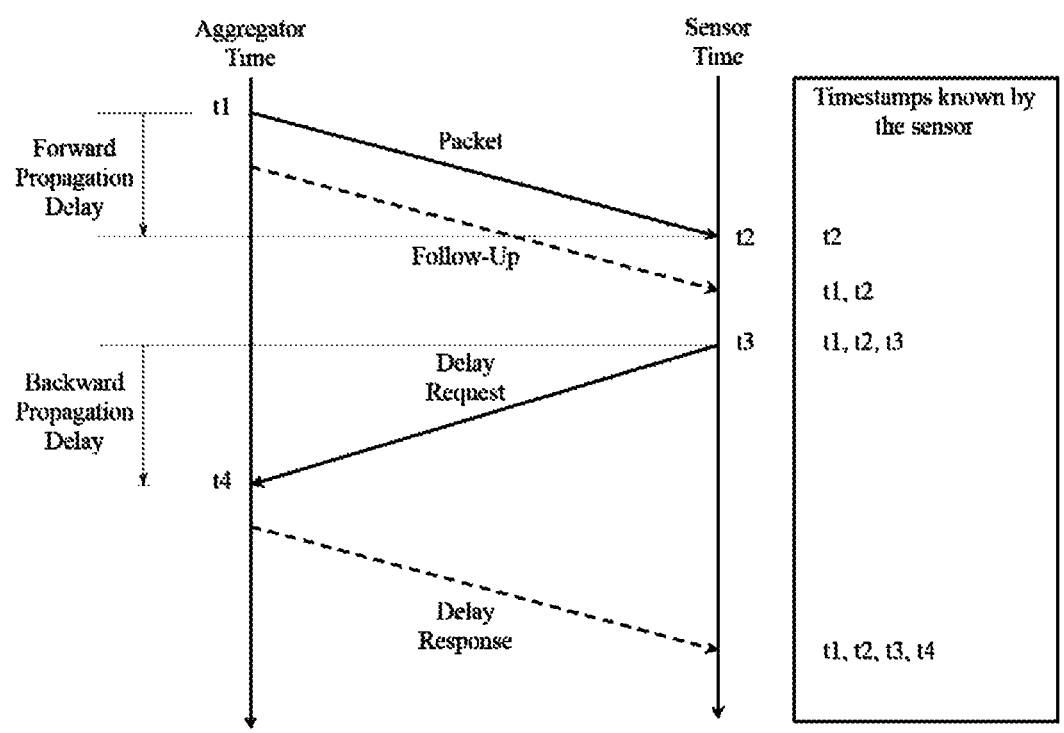
FIG. 4 illustrates a timing diagram for time synchronization of a sensor using a data aggregator as the first device.

FIG. 4 illustrates a timing diagram for time synchronization of the sensor 320a using the data aggregator 330. The data aggregator 330 sends a packet to the sensor 320a at time $t_1$. The packet includes a timestamp $t_1$ for time synchronization of the sensor 320a. The packet is received at the sensor 320a at time $t_2$. The sensor 320a will use a clock provided at the sensor 320a to timestamp the time $t_2$. The data aggregator 330 may also send a follow up packet with a timestamp $t_1$, in order to account for the delay in transmission of the packet, which is registered by the sensor 320a. The sensor 320a determines a forward time $A_{11}$ from the timestamps $t_1$ and $t_2$ using equation 1.

The forward time $A_{11}$ is the sum of offset of the clock provided at the sensor 320a and a propagation delay $C_{11}$ of the packet from the data aggregator 330 to the sensor 320a. The sensor 320a then sends a delay request to the data aggregator 330 at time $t_3$, to account for the propagation delay $C_{11}$. The delay request is received at the data aggregator 330 at time $t_4$. The data aggregator 330 then sends a delay response to the sensor 320a, with the timestamp $t_4$. The sensor 320a determines the backward time $B_{11}$ from the timestamps $t_3$ and $t_4$ using equation 2.

The sensor 320a, similarly, determines the first set of forward times (for e.g., $A_{11}, A_{12}, A_{13} \ldots A_{1n}$ etc.) and the first set of backward times (for e.g., $B_{11}, B_{12}, B_{13} \ldots B_{1n}$ etc.) from the first set of packets and the first set of delay responses, received from the data aggregator 330, respectively. The sensor 320a then determines a first minimum forward time $A_{1min}$ and a first minimum backward time $B_{1min}$, from the first set of forward times and the first set of backward times, respectively. A first correction factor $\Delta_1$ is then determined by the sensor 320a from the first minimum forward time $A_{1min}$ and the first minimum backward time $B_{1min}$ using equation 3.

The sensor 320a then applies the first correction factor $\Delta_1$ to the clock provided at the sensor 320a, at a time instance $T_{11}$. The data aggregator 330 stores the first correction factor $\Delta_1$ along with a network location of the sensor 320a. The same method is utilized by other sensors from the plurality of sensors 320, to time synchronize the respective clocks with the data aggregator 330.

The respective clocks provided at the data aggregator 330 and the plurality of sensors 320 have a tendency to drift independently. Therefore the time synchronization of the plurality of sensors 320 with the data aggregator 330 is performed repeatedly to keep the clocks provided at the plurality of sensors 320 time synchronized.

A plurality of correction factors are determined and stored during repeated time synchronization of the plurality of sensors 320. The plurality of correction factors are used to correct the plurality of time instances corresponding to the plurality of failures logged by the plurality of sensors 320. For e.g., the sensor 320a is time synchronized for the second time at the time instance $T_{22}$. The corresponding second correction factor $\Delta_2$ is stored at the data aggregator 330. Then the time instance T corresponding to a failure logged by the sensor 320a between the time instances $T_{11}$ and $T_{22}$ is corrected using equation 4.

$$T_C = T_{11} + \frac{T - T_{11}}{T_{22} - T_{11}}(\Delta_2 - \Delta_1) \qquad \text{(Eqn 4)}$$

Where $T_C$ represents a corrected time instance of the failure. The same method can be applied to all other time instances corresponding to the plurality of failures logged by the plurality of sensors 320.

Figure 5:
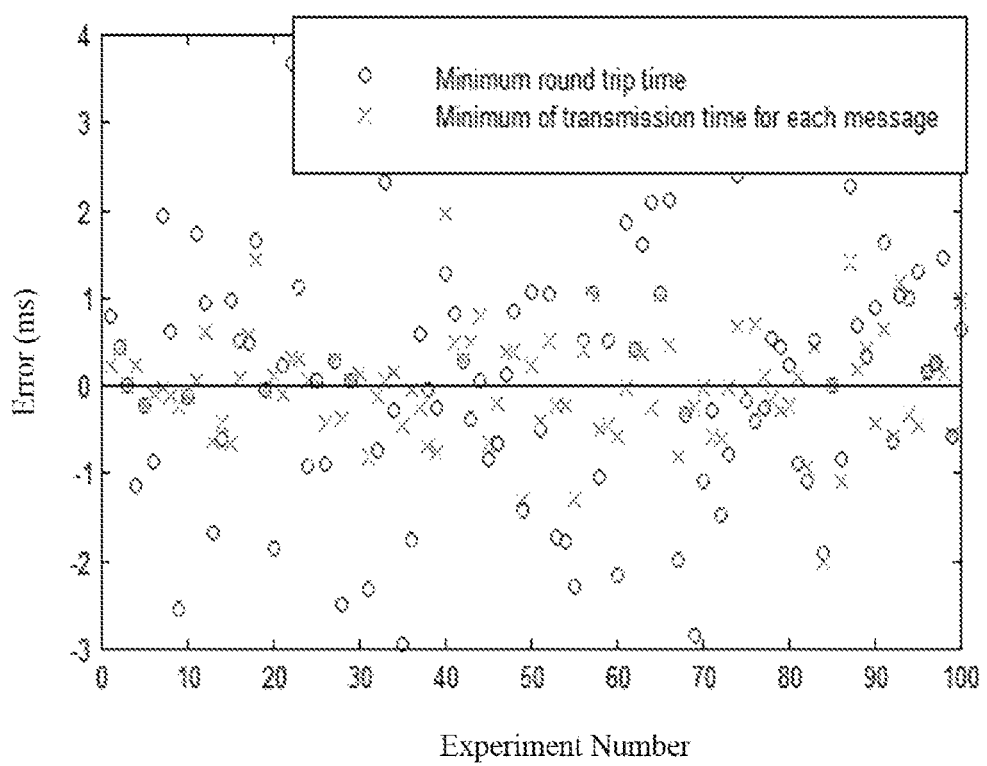
FIG. 5 illustrates a comparison between the time synchronization error values corresponding to a method used in accordance with prior art and time synchronization error values corresponding to the present invention.

FIG. 5 illustrates a comparison between the time synchronization error values corresponding to a method used in accordance with prior art and time synchronization errors values corresponding to the present invention. The time synchronization error values corresponding to the method in accordance with the prior art are shown with 'o' markers. The time synchronization error values corresponding to the present invention are shown with 'x' markers. The method in accordance with the prior art determines the correction factor from minimum round trip time. The minimum round trip time is the minimum time taken between the sending of a delay request by the second device to the first device and receipt of a delay response from the first device at the second device, for a plurality of delay requests.

The present invention applies a minimum of a plurality of times taken by a plurality of packets to travel from the first device to the second device and a minimum of a plurality of times taken by a plurality of delay requests to travel from the second device to the first device, for determination of the correction factor. It can be seen from the FIG. 5, that the time synchronization error values corresponding to the present invention are relatively smaller than the time synchronization error values corresponding to the method in accordance with the prior art. By doing so the current invention is able to select values of $A_{1min}$ and $B_{1min}$ where the influence of network delay is minimum. Hence the present invention provides a relatively more accurate method of time synchronization.

Moreover the invention enables the time synchronization of a plurality of control devices in distributed systems (for e.g., power systems and process automation systems etc.) using a mobile handheld device. The use of the mobile handheld device for time synchronization has a multitude of advantages. First the mobile handheld device is portable, and can be conveniently carried to any section of the plant. The mobile handheld device supports a multitude of network protocols, allowing greater flexibility in the choice of the control network 104. Also the mobile handheld device is time synchronized with a GPS clock and allow the one or more IEDs to be time synchronized with the GPS clock. The GPS clock benefits from the use of atomic time which can deliver time up to an accuracy of one second in sixty million years.

Moreover the solution can be economically implemented to legacy devices such as low end control devices. Multiple devices can be time synchronized in a relatively short duration of time by implementing controller-subordinate configuration to the plurality of networked control devices. Moreover the method could be extended to the control devices in remote or inaccessible locations of the plant.

It will be appreciated that features of the present disclosure are susceptible to being combined in various combinations without departing from the scope of the present disclosure as defined by the appended claims.

We claim:

1. A method for time synchronizing one or more devices in an automation environment using a first device, the one or more devices being connected through a control network, wherein the first device comprises information of a topology of the control network, the method comprising:

selecting, by the first device, a second device in the control network, based on the information of the topology of the control network;

sending, by the first device, a first set of packets to the second device, wherein the first set of packets includes at least one timestamp;

receiving, by the first device, a first set of delay requests corresponding to the first set of packets;

sending, by the first device, a first set of delay responses to the second device corresponding to the first set of delay requests;

determining, by the second device, a first set of forward times and a first set of backward times, based on the first set of packets and the first set of delay responses, respectively;

determining, by the second device, a first minimum forward time from the first set of forward times and a first minimum backward time from the first set of backward times;

determining, by the second device, a first correction factor, from the first minimum forward time and the first minimum backward time, corresponding to a first instance of time synchronization;

applying, by the second device, the first correction factor to a clock provided at the second device and storing the first correction factor at the first device; and correcting a time instance of an event logged by the second device based on the first correction factor.

2. The method as claimed in claim 1, wherein the selection of the second device from the topology of the control network is based on a number of devices in direct communication with the second device.

3. The method as claimed in claim 1, wherein the selection of the second device from the topology of the control network is based on strength of a connection between the second device and a third device to be time synchronized.

4. The method as claimed in claim 1, wherein the control network comprises at least one backup device, wherein the at least one backup device is configured for time synchronizing the one or more devices upon a failure of the first device.

5. The method as claimed in claim 1, comprising:

sending, by the first device, a second set of packets to the second device and receiving, by the first device, a second set of delay requests corresponding to the second set of respective packets;

sending, by the first device, a second set of delay responses to the second device corresponding to the second set of respective delay requests;

determining, by the second device, a second set of forward times and a second set of backward times, based on the second set of packets and the second set of delay responses, respectively;

determining, by the second device, a second minimum forward time from the second set of forward times and a second minimum backward time from the second set of backward times;

determining, by the second device, a second correction factor, from the second minimum forward time and the second minimum backward time, corresponding to a second instance of time synchronization; and applying, by the second device, the second correction factor to the clock provided at the second device and storing the second correction factor at the first device; and correcting the time instance of the event logged by the second device, the time instance of the event being logged between the first instance of time synchronization and the second instance of time synchronization, by interpolating the time instance of the event based on the first correction factor and the second correction factor.

6. The method as claimed in claim 5, wherein the interpolation of the time instance of the event comprises utilization of a linear interpolation function.

* * * * *